April 15, 1969 L. R. SMITH 3,439,350

MAGNETIC CORE COUNTER AND SHIFT REGISTER

Filed April 23, 1965

Sheet 1 of 3

Inventor
Lawrence R. Smith
By
Mueller, Aichele & Rauner
Attys.

RESET

FIRST COUNT

SECOND COUNT
(DURING PULSE)

SECOND COUNT

Inventor
Lawrence R. Smith
By
Mueller, Aichele & Rauner
Attys.

COUNT 1
STORE

SHIFT
PRIME

SHIFT
(DURING
PULSE)

SHIFT
COMPLETE

Inventor
Lawrence R. Smith
By
Mueller, Aichele & Rauner
Attys.

United States Patent Office 3,439,350

Patented Apr. 15, 1969

3,439,350
MAGNETIC CORE COUNTER AND SHIFT REGISTER

Lawrence R. Smith, Phoenix, Ariz., assignor to Motorola, Inc., Franklin Park, Ill., a corporation of Illinois Filed Apr. 23, 1965, Ser. No. 450,406
Int. Cl. G11b *5/00;* G11c *19/00, 11/02*
U.S. Cl. 340—174 18 Claims This invention relates to improved magnetic systems, and particularly to magnetic core devices and related circuit arrangements adapted to store and to transfer binary information, thereby functioning as a binary counter and a shift register.

The magnetic systems to be hereinafter described utilize multi-apertured magnetic cores which are composed, for example, of ferrite material exhibiting essentially rectangular hysteresis loop characteristics. These cores, in conjunction with associated windings on respective legs thereof and appropriate switching circuits, as will be described, produce circuit arrangements that function as binary counters and shift registers.

There are numerous instances where it is desirable to count and store binary information, with the binary information so stored being available for either serial or non-destructive parallel readout. The binary information (i.e., binary "1" or "0") may be represented by the presence or absence of current pulses, which pulses in turn may be applied to appropriate windings on legs of the cores to set the magnetization thereof about certain flux paths in one or the other of two static states of magnetization.

It is therefore an object of the invention to provide a combined magnetic counter and shift register that will store digital information equal to the number of pulses applied to one input, and at a later time provide serial and/or parallel read out of the stored information in response to clocked and timed pulses applied to further inputs.

The novel circuit arrangement for achieving the foregoing object of the invention includes a plurality of binary counter/shift register stages, each stage including a multi-apertured magnetic core with an input winding energized by a resistance-reactance delay network, and with each stage connected in cascade by a transfer circuit having a switching transistor. The delay network may include a resistor and an inductor, or a capacitor and a resistor, and is arranged to delay flux switching of the cores, and to delay triggering of the switching transistor on subsequent pulses, until after termination of the input pulse to each stage. In addition, each stage transfers a pulse to the next only on every other pulse applied to it, so that the cascaded stages count and store pulses successively applied to one input. Prime and shift lines also link legs of the cores and are arranged so that sequentially applied shift prime and shift pulses will shift the stored information, one bit at a time, along the cascaded stages, and read prime and read lines link further legs of the core for non-destructive readout of stored information in response to sequentially applied read prime and read pulses.

It is accordingly another object of the invention to provide an improved magnetic binary counter and shift register having a delay in flux reversal of the cores thereof so that each transistor in the transfer circuit between cores is not switched on until the transistor of the preceding transfer circuit is switched off, thus eliminating the necessity of feedback between stages to turn off the preceding state to prevent miscounting.

A further object of the invention is to provide an improved magnetic binary counter and shift register in which the binary "1" state in any stage requires two separate input pulses in order to produce an output, allowing reset by a single pulse on a reset winding without generating spurious outputs.

Still another object of the invention is to provide a novel magnetic binary counter and shift register in which a delay in flux switching of the cores and in the transfer of pulses between cores enables the magnetic states of the cores to be shifted one at a time with the sequential application of pulses to a shift prime winding and a shift winding.

A still further object of the invention is the provision of a magnetic binary counter and shift register wherein a delay in flux reversal in response to an input pulse eliminates the effect of noise caused by reversible flux switching in the cores.

Other objects, as well as the features and attending advantages of the invention, will become apparent from the folowing detailed description taken in conjunction with the accompanying drawings, in which.

Figures 1, 3:
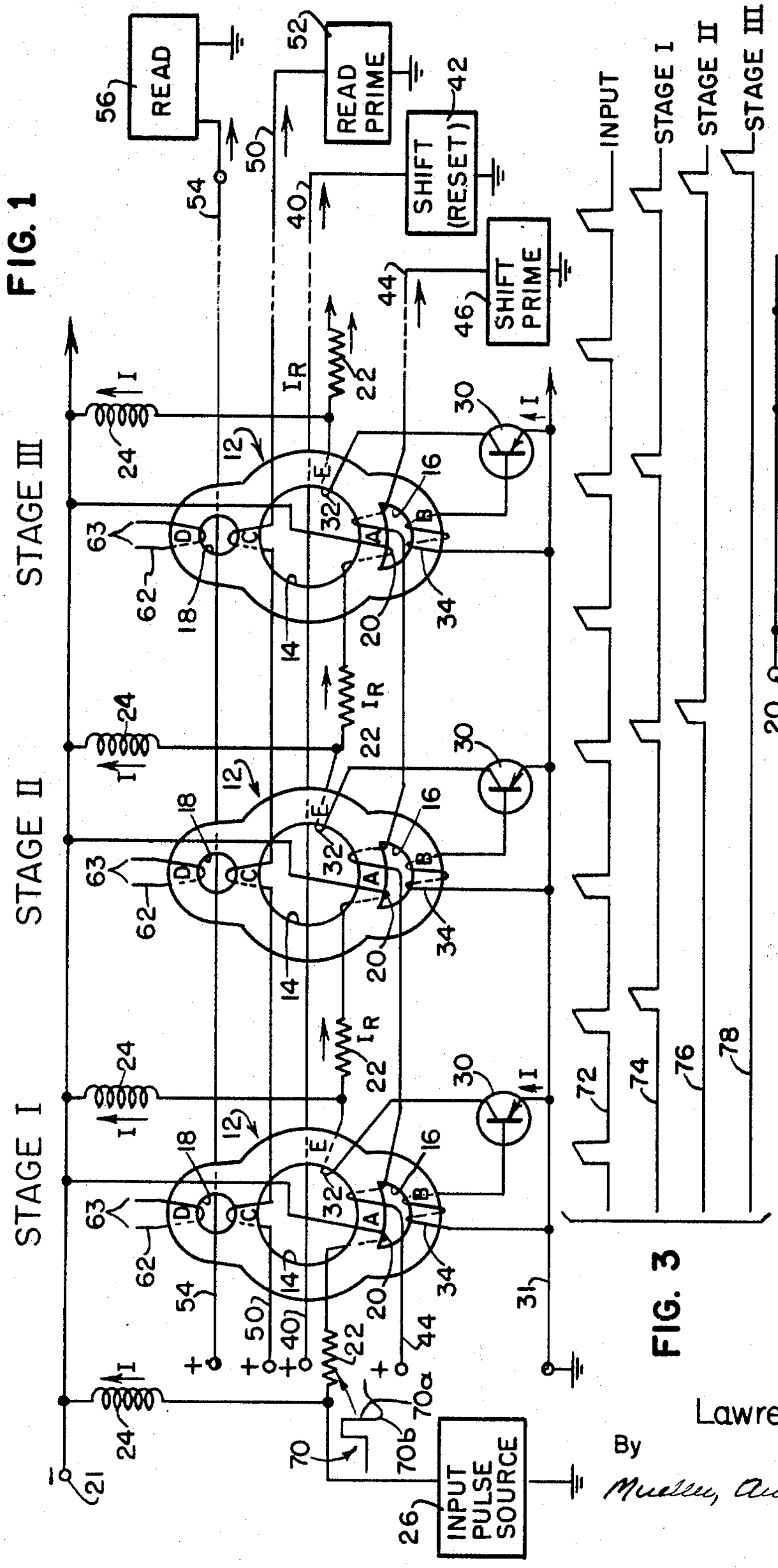
FIG. 1 is a circuit diagram of a magnetic core binary counter and shift register constructed in accordance to the concepts of the present invention.
FIG. 3 illustrates waveforms further explaining the operation of the circuit of FIG. 1 as a counter.

Referring now to FIG. 1, a magnetic counter and shift register of the invention has, illustratively, three identical stages designated as stages I, II and III. Each stage includes core 12 having three apertures 14, 16 and 18 therein. The main or center aperture 14 is larger than peripheral apertures 16 and 18. These apertures, in turn, form legs A, B, C, D and E in each core. Each core 12 may be made of suitable known magnetic ferrite material, and they exhibit the usual rectangular hysteresis loop characteristics of such material.

The input circuit for each core includes winding 20, linking leg A between apertures 14 and 16. One end of winding 20 is returned directly to a DC voltage source at terminal 21. The other end of winding 20 is also returned to the DC voltage source at terminal 21 via a delay network including resistor 22 and inductor 24. Inductor 24 is a linear inductor, that is, an inductor whose characteristic is defined by the linear differential equation, $e=Ldi/at$ where L is a constant.

The junction of resistor 22 and inductor 24 forms the input point which is returned to a reference potential (such as ground) via a switch. In the instance of the first stage (stage I) the switch may be incorporated input pulse source 26 and may include, for example, a transistor and suitable driving means therefor. In subsequent stages transistor 30 is utilized as the switch, and in conjunction with suitable windings on the preceding stage, as hereinafter discussed, functions as a transfer circuit between stages.

The collector of transistor 30 is connected to the junction of resistor 22 and inductor 24 by winding 32, which extends through center aperture 14 and around leg E of core 12 of a preceding stage. The emitter of transistor 30 is returned to a reference potential (such as ground) at terminal 31. The base of transistor 30 is returned to its emitter by winding 34, which extends through aperture 16 and around leg B of core 12 of a previous stage. Windings 20 and 32 may be a single turn, and winding 34 is preferably several turns. With transistor 30 a PNP transistor, as shown, and with a negative voltage applied to terminal 21 and terminal 31 at ground reference potential, current flow when transistor 30 conducts is as shown by the arrows in FIG. 1. It is to be noted that total collector current for transistor 30 divides between resistor 22 and inductor 24, both of which are returned to the voltage at terminal 21.

A shift prime line 44 interconnects each core 12 and extends through aperture 16 and around leg A of each core. One end of line 44 may be connected to a positive voltage source and the other end returned to a reference potential such as ground by a switch 46, operable to apply current pulses on line 40 in a direction shown by the arrow of FIG. 1. Similarly, shift (and reset) line 40 is threaded through center aperture 14 of each core, providing a current path between a positive voltage source and a reference potential via switch 42.

A read prime line 50 interconnects each core, extending through center aperture 14 and around leg C. As with shift prime line 40, one end of read prime line 50 may be connected to a positive voltage source and the other end returned to a reference potential by switch 52, operable to apply current pulses to line 50 in a direction shown by the arrow of FIG. 1. Read line 54, having one end connected to a positive voltage source, extends through aperture 18 of each core and is returned to a reference potential by switch 56, also operable to apply current pulses to line 54. Independent windings 62 are linked through aperture 18 around leg D of each core to provide a plurality of outputs at terminal 63 for parallel readout for each stage.

Operation of the circuit of FIG. 1 in the counter mode can best be understood with reference to FIGS. 2A–2D and FIG. 3. FIGS. 2A–2D illustrate the magnetic flux state of cores 12 (two stages being shown) with the application of two successive binary "1" pulses to stage I of the circuit of FIG. 1. FIG. 3 illustrates a series of binary "1" input pulses to the first stage and the resulting pulses appearing at the collector of transistor 30 for successive stages.

Figure 2A:
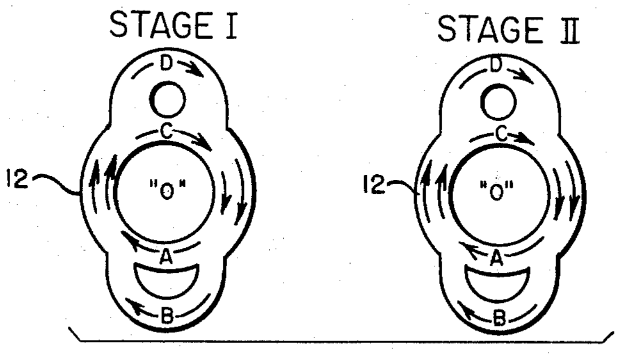
FIGS. 2A–2D are schematic core representations useful in explaining operation of the circuit of FIG. 1 in the counter mode.

Cores 12 of FIG. 2A are shown in their binary "0" (or cleared) state, with the cores saturated about the large center aperture in a clockwise sense. The solid arrow in FIGS. 2A–2D (and subsequent figures) represents the flux path of one of two static states of magnetization, and the dotted arrow represents the flux path of the other static state of magnetization. The first input pulse initially produces current flow through resistor 22 (of stage I) in a direction to further saturate leg A and there is no change in flux states. However, there is a current build-up in inductor 24 and at the end of the input pulse, current in inductor 24 continues to flow which causes the current through resistor 22 to reverse. The resulting current flow through resistor 22 is illustrated by waveform 70 of FIG. 1, wherein portion 70*a* represents current during the first input pulse and portion 70*b* represents current subsequent to the input pulse as a result of the delay provided by inductor 24.

Figure 2B:
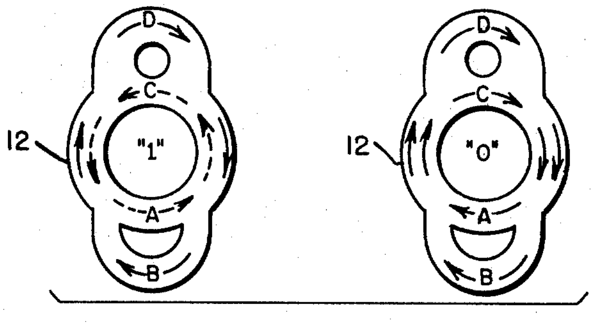

Reverse current flow during portion 70*b* of the current pulse through resistor 22 reverses the flux in legs A and C of core 12 of the first stage, that is, produces a flux reversal about the inner periphery of center aperture 14, as shown in FIG. 2B. This flux reversal does not link either winding 34 on leg B or the readout windings on leg D so that there is no information transfer or an output signal generated. The second and subsequent stages remain in their binary "0" condition. As a result core 12 of the first stage is switched to the binary "1" state and an information bit is stored.

Figure 2C:
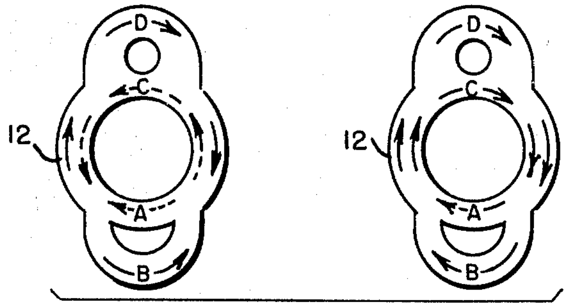
Figure 2D:
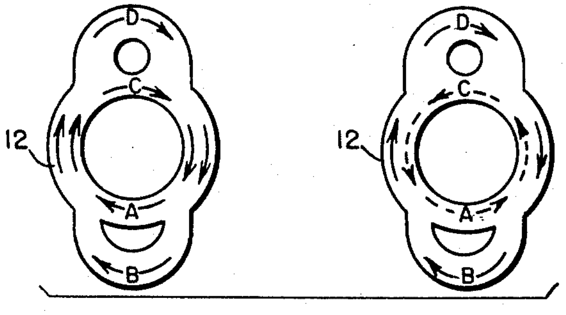

The next input pulse again produces current flow through resistor 22 and inductor 24 to provide current waveform 70. Since core 12 of the first stage is now in the binary "1" state (FIG. 2B) there will be a flux reversal in legs A and B during portion 70*a* of the current waveform. This momentary flux state is shown in FIG. 2C, and induces a voltage pulse in winding 34 in a direction that does not switch transistor 30 (normally cutoff). Subsequent current reversal in resistor 22 (portion 70*b* of the current waveform) again reverses flux in legs A and B and produces a voltage pulse in winding 34 that initiates turn-on of transistor 30. Collector current in transistor 30, through winding 32, inhibits current reversal in leg A and has a regenerative effect on reversal of flux in leg B, resulting in flux reversal in leg B and around the inner periphery of center aperture 14. As a result, core 12 of stage 1 is returned to its binary "0" state. At the same time transistor 30 transfers a pulse to the next stage and accordingly core 12 of stage 2 is now switched from the binary "0" state to the binary "1" state, as shown in FIG. 2D.

Subsequent input pulses cause conduction of transistor 30 and resulting current flow through resistor 22 and inductor 24 of stage 1 on every other pulse, of stage 2 on every fourth pulse, of stage 3 on every eighth pulse, and so on. This is shown in FIG. 3 wherein waveform 72 represents pulses from input pulse source 26, waveform 74 represents current through transistor 30 of stage 1, waveform 76 of current through transistor 30 of stage 2, and waveform 78 of current through transistor 30 of stage 3. It is readily apparent that the above described circuit counts and stores input pulses as a binary code. The pulses induced in winding 34 to trigger a successive transistor 30, thereby transferring an input pulse to a subsequent stage, is delayed by inductor 24 providing a reverse current flow through resistor 22, and each transistor 30 is not triggered until a preceding transistor is turned off. The resulting delay in triggering transistor 30 of successive stages is illustrated by waveforms 72, 74, 76 and 78 of FIG. 3. This eliminates the necessity of feeding back a voltage in order to turn off a preceding stage to prevent miscounting.

Inductor 24, in addition, eliminates the effect of noise caused by reversible flux switching in cores 12. It is well-known that the hysteresis loop of such cores is not perfectly rectangular and that an applied MMF in a direction to further saturate a core may cause some additional flux to reverse. Flux reversal of this type, however, has the characteristic of switching very rapidly. This rapid switching may, in turn, momentarily turn on transistor 30, but the transistor will not remain on sufficiently long to build up enough current through inductor 24 to cause flux switching in a subsequent core.

It is to be noted (from FIGS. 2A–2D) that in the binary "0" state, core 12 is saturated about center aperture 14 in a clockwise direction, while in the binary "1" state there is a flux reversal about the inner periphery of center aperture 14. By applying a single pulse to reset (and shift) line 40 in a direction that tends to further saturate all cores in the binary "0" state, there is no flux reversal as to such cores, but the pulse will produce a flux reversal about the inner periphery of cores in the binary "1" state. This does not link any output winding and thus returns such cores to the binary "0" state without inducing a spurious output signal. Since any core in the binary "1" state requires two sequential pulses to produce an output, the counter may therefore be reset by a single pulse on line 44 without generating spurious outputs.

Figure 4:
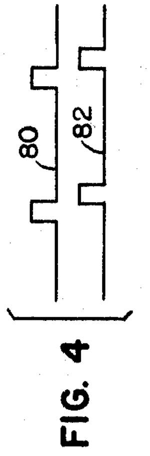
FIG. 4 illustrates shift prime and shift waveform which may be applied to the circuit of FIG. 1 to result in operation as a shift register.

The magnetic states of cores 12 may be shifted one core to the right (in the arrangement of FIG. 1), after count and storage of a series of input pulses, by sequentially applying pulses to shift prime line 44 and to shift (reset) line 40. With reference to FIG. 4 such pulses may be timed so that shift pulses 82 immediately follow shift prime pulses 80. The resulting operation may be best seen from FIGS. 5A–5D, illustrating the magnetic states of cores 12 for three states resulting from the timed shift prime and shift pulses of FIG. 4.

Figure 5A:
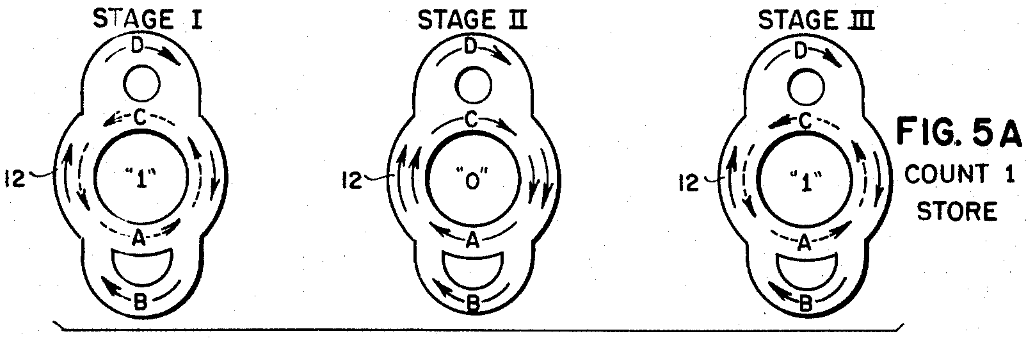
FIGS. 5A–5D are schematic core representations useful in explaining the operating of the circuit of FIG. 1 in the shift register mode.
Figure 5B:
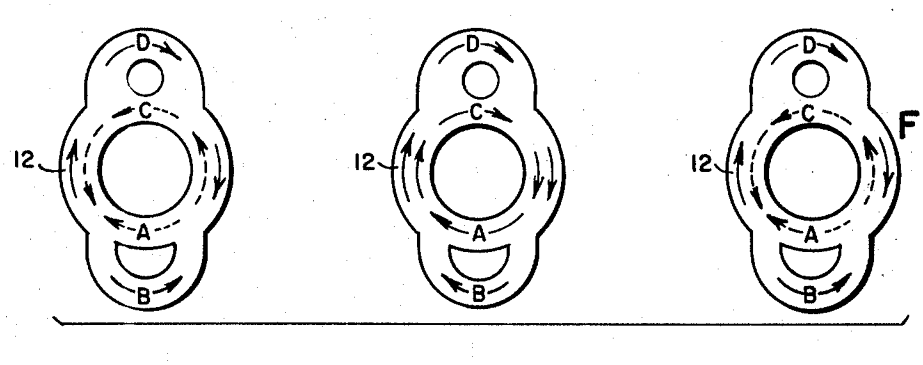

FIG. 5A illustrates the magnetic state of cores 12 for three stages of the circuit of FIG. 1 after a count and store cycle, representatively shown in the 101 condition. A shift prime pulse (such as shown by waveform 80 of FIG. 4) on line 44 will cause flux reversal in legs A and B for all cores in the binary "1" state. The resulting voltage induced in winding 34 is in a direction to further cut transistor 30 off and it does not conduct. At the same time, shift prime pulses further saturate all cores in the binary "0" state and there is no flux reversal as to such cores. The resulting condition after application of a shift prime pulse on line 44 is illustrated by FIG. 5B.

Figure 5C:
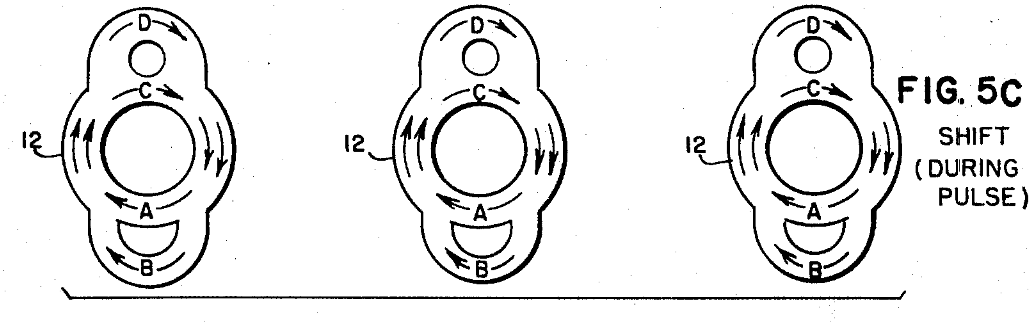

A shift pulse is subsequently applied to line 40, as shown by waveform 82 of FIG. 4. During the shift pulse, the magnetic force is in the direction to return all cores to their zero state. This force causes a flux reversal in legs A and B of all cores that were originally in the binary "1" state to initiate turn-on of any transistor 30 having its base connected to winding 34 on such cores. As in the instance of the counting operation, current through transistor 30 regenerates flux reversal in leg B but inhibits flux reversal in leg A. Consequently all cores that were originally in the binary "1" state are switched to the binary "0" state. The condition of the cores during a shift pulse applied to line 40 is shown in FIG. 5C.

Conduction of each transistor 30 that has its base coupled by winding 34 to cores originally in the binary "1" state transfers a current pulse, via resistance 22 and inductor 24 to the next stage. The next stage is in turn switched to the binary "1" state in the manner previously discussed.

Figure 5D:
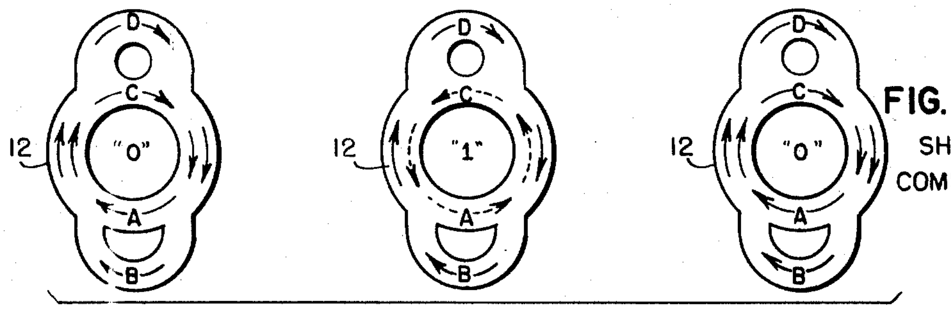

As a result of the foregoing the states of cores 12 for the three illustrative stages originally in the 101 condition are shifted to their 010 condition, or shifted one bit to the right, as shown in FIG. 5D. By applying the output of the final stage to suitable utilization circuitry it is possible to provide serial readout, over a single channel, of stored information in response to a series of timed shift prime and shift pulses. By clocking the shift prime and shift pulses with count pulses and a read prime and read cycles, it is further possible to perform a count-shift operation, useful in multiplication and in a number of telemetry control functions.

Non-destructive parallel readout of the above described magnetic counter and shift register, in any given condition, may be achieved by successively applying read prime and read pulses to lines 50 and 54, respectively. The read prime pulses reverse flux in legs C and D, providing flux switching about apertures 18 for each core 12 in the binary "1" state. A subsequent read pulse will again reverse flux in legs C and D which returns such cores to their original "1" state, and an output is provided in windings 62, at terminals 63. Both the read prime and read pulse tend to further saturate flux in legs C and D of cores in the binary "0" state, with no flux reversal, and no output is produced in winding 62 for such cores.

Figure 6:
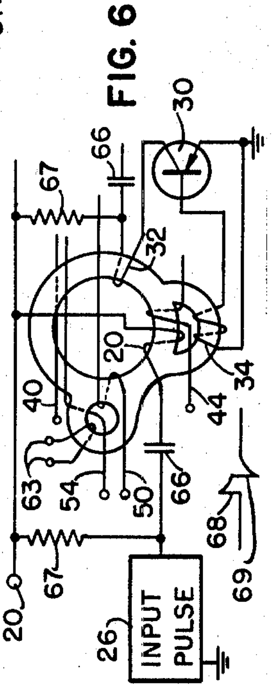
FIG. 6 shows a modification of the circuit of FIG. 1.

FIG. 6 illustrates a modification of the circuit for applying the input pulses to the cores. Only one core is shown, but it will be obvious that the circuit shown can be applied to each of the stages in the system of FIG. 1. The resistor 22 of FIG. 1 is replaced by capacitor 66, and the inductor 24 is replaced by resistor 67. The input pulse acts to charge capacitor 66 and the charging current applied to winding 20 is shown by the waveform 68. The capacitor 66 may be charged to the full voltage of the pulse, but this is not essential and in waveform 68 the charging current is still above zero at the end of the input pulse. At the termination of the input pulse, the capacitor 66 will discharge through resistor 67 to provide reversal of the current in winding 20 as shown by the waveform 69. This acts in the same way as the reverse current (70*b*) in the system of FIG. 1 to reverse the flux in legs A and C of the core (FIG. 2B).

In FIG. 6, the core is shown of a somewhat different shape from that of the cores 12 in FIG. 1. This illustrates that the cores may have different shapes as long as the required core portions are provided. The various windings are coupled to the core in FIG. 6 in the same way, and produce the same functions, as in FIG. 1.

The invention provides, therefore, an improved magnetic system utilizing magnetic core devices and related circuit arrangements to store and transfer binary information, and which is particularly adapted to function as a counter and a shift register. While particular embodiments have been shown and described in detail, modifications may be made, and the following claims are intended to cover all modifications falling within the scope of the invention.

I claim:

1. A magnetic circuit including in combination; a plurality of magnetic cores exhibiting essentially rectangular hysteresis loop characteristics, each of said cores having a main aperture and at least a second aperture located near the periphery of said main aperture; input circuit means for each of said cores including a first winding linking said main aperture and said second aperture, and resistor means and reactance means connected in series with said first winding, with the junction of said resistor means and said reactance means forming the input point; means applying input pulses to said input point of said input circuit means for one core; and a transfer circuit coupling each core to the next core, each of said transfer circuits including electronic switching means having output and control electrodes, a second winding linking said main aperture of said one core and connected between said output electrode and the input point of said input circuit means for the next core, and a third winding linking said second aperture of said one core and connected to the control electrode of said electronic switching means.

2. A magnetic circuit including in combination; a plurality of magnetic cores exhibiting essentially rectangular hysteresis loop characteristics, each of said cores having a main aperture and at least a second aperture located near the periphery of said main aperture, input circuit means for each of said cores including a first winding linking said main aperture and said second aperture, and resistance means and inductance means connected in series with said first winding, with the junction of said resistance means and said inductance means forming the input point; means applying input pulses to said input point of said input circuit means for one core; and a transfer circuit coupling each core to the next core, each of said transfer circuits including electronic switching means having output and control electrodes, a second winding linking said main aperture of said one core, and connected between said output electrode and the input point of said input circuit means for the next core, and a third winding linking said second aperture of said one core and connected to the control electrode of said electronic switching means.

3. A magnetic circuit including in combination; a plurality of magnetic cores exhibiting essentially rectangular hysteresis loop characteristics, each of said cores having a main aperture and at least a second aperture located near the periphery of said main aperture; input circuit means for each of said cores including a first winding linking said main aperture and said second aperture, and resistor means and capacitor means connected in series with said first winding, with the junction of said resistor means and said capacitor means forming the input point; means applying input pulses to said input point of said input circuit for one core; and a transfer circuit coupling each core to the next core, each of said transfer circuits including electronic switching means having output and control electrodes, a second winding linking said main aperture of said one core, and connected between said output electrode and the input point of said input circuit for the next core, and a third winding linking said second aperture of said one core and connected to the control electrode of said electronic switching means.

4. A magnetic circuit including in combination; a plurality of magnetic cores exhibiting essentially rectangular hysteresis loop characteristics, each of said cores having a main aperture and at least a second aperture located near the periphery of said main aperture; input circuit means for each of said cores including resistance means and reactance means connected in series with one another and in parallel to an input point, a first winding linking said central aperture and said second aperture, first and second means connecting said resistance means and said reactance means respectively between said input point and a first voltage point providing a direct current potential with respect to a reference point, one of said first and second means including said first winding; pulsing means selectively connecting said input point of said input circuit for one core to the reference point to apply current to said first winding; and a plurality of transfer circuits coupling said cores in cascade, each of said transfer circuits including electronic switching means having input, output and common electrodes with said common electrode connected to the reference point, a second winding linking said main aperture of said one core and connected between said output electrode and said input point of said input circuit for the next core, and a third winding linking said second aperture of said one core and connected between said control electrode and said common electrode of said switching means.

5. A magnetic circuit including in combination; a plurality of magnetic cores exhibiting essentially rectangular hysteresis loop characteristics, each of said cores having a main aperture and at least a second aperture located near the periphery of said main aperture; input circuit means for each of said cores including a resistance element and an inductance element connected in series with one another and in parallel to an input point, a first winding linking said main aperture and said second aperture and connected between said resistance element and a first voltage point providing a direct current potential with respect to a reference point, and means connecting said inductance element to said first voltage point; means applying input pulses to said input point of said input circuit for one core; and a plurality of transfer circuits coupling said cores in cascade, each of said transfer circuits including electronic switching means having input, output and common electrodes with said common electrode connected to the reference point, a second winding linking said main aperture of said one core and connected between said output electrode and said input point of said input circuit for the next core, and a third winding linking said second aperture of said one core and connected between said control electrode and said common electrode of said switching means.

6. A magnetic circuit including in combination; a plurality of magnetic cores exhibiting essentially rectangular hysteresis loop characteristics, each of said cores having a main aperture and at least a second aperture located near the periphery of said main aperture; input circuit means for each of said cores including resistor means and capacitor means connected in series with one another and in parallel to an input point, a first winding linking said central aperture and said second aperture and connected between said capacitor means and a first voltage point providing a direct current potential with respect to a reference point, and means connecting said resistor means to said first voltage point; pulsing means connecting said input point of said input circuit for one core to the reference point; and a plurality of transfer circuits coupling said cores in cascade, each of said transfer circuits including electronic switching means having input, output and common electrodes with said common electrode connected to the reference point, a second winding linking said main aperture of said one core and connected between said output electrode and said input point of said input circuit for the next core, and a third winding linking said second aperture of said one core and connected between said control electrode and said common electrode of said switching means.

7. A magnetic circuit including in combination; a plurality of magnetic cores exhibiting essentially rectangular hysteresis loop characteristics, each said core having a main aperture and at least a second aperture located near the periphery of said main aperture; input circuit means for each of said cores including resistor means and reactor means connected in series with one another and in parallel to an input point, a first winding linking said central aperture and said second aperture, and first and second circuit means connecting said resistor means and said reactor means respectively between said input point and a first voltage point providing a direct current potential with respect to a reference point, one of said first and second circuits including said first winding; and a plurality of transfer circuits coupling said cores in cascade, each of said transfer circuits including a transistor having collector, emitter and base electrodes, a second winding linking said main aperture of one core and connected between said collector electrode and said input point of said input circuit of the next core, a third winding linking said second aperture of said one core and connected between said base electrode and said emitter electrode, and means connecting said emitter electrode to the reference point.

8. A magnetic system for storing and transferring magnetic information including in combination; a plurality of magnetic cores exhibiting essentially rectangular hysteresis loop characteristics, each core having a central aperture and at least a second aperture located near the periphery of said central aperture; an input circuit for each of said cores including a resistor and an inductor connected in series with one another, a first winding linking said central aperture and said second aperture and connected between said resistor and a first voltage point, and means connecting said inductor to said first voltage point; and a plurality of transfer circuits connecting said cores in cascade, each of said transfer circuits including a transistor having collector, emitter and base electrodes, a second winding linking said central aperture of one core and connected between said collector electrode and the junction point of said resistor and inductor of said input circuit of the next core, a third winding linking said second aperture of said one core and connected between said base and emitter electrodes, and means connecting said emitter electrode to a second voltage point; and means for applying pulses representative of binary information to the junction of the resistor and inductor of said input circuit of said one core.

9. A magnetic system for storing and transferring binary information including in combination; a plurality of magnetic cores exhibiting essentially rectangular hysteresis loop characteristics, each core having a main aperture and at least a second aperture located near the periphery of said main aperture; an input circuit for each of said cores including resistance means and reactance means connected in series with one another and in parallel to an input point, a first winding linking said central aperture and said second aperture, and first and second circuit means connecting said resistance means and said reactance means respectively between said input point and a first voltage point providing a direct current potential with respect to a reference potential, one of said first and second circuit means including said first winding; pulsing means selectively connecting said input point of said input circuit for one core to the reference point to apply pulses of current to said first winding representative of binary information; a plurality of transfer circuits coupling said cores in cascade, each of said transfer circuits including a transistor having collector, emitter and base electrodes, a second winding linking said main aperture of one core and connected between said collector electrode and said input point of said input circuit for the next core, a third winding linking said second aperture of said one core and connected between said base and emitter electrodes, and means connecting said emitter electrode to said reference potential; and reset means including a reset line linking said main apertures of all said cores.

10. A magnetic system for storing and transferring binary information including in combination; a plurality of magnetic cores exhibiting essentially rectangular hysteresis loop characteristics, each core having a main aperture and at least a second aperture located near the periphery of said main aperture; an input circuit for each of said cores including resistance means and reactance means connected in series with one another and in parallel to an input point, a first winding linking said central aperture and said second aperture, and first and second circuit means connecting said resistance means and said reactance means respectively between said input point and a first voltage point providing a direct current potential with respect to a reference potential, one of said first and second circuit means including said first winding; pulsing means selectively connecting said input point of said input circuit for one core to the reference point to apply pulses of current to said first winding representative of binary information; a plurality of transfer circuits coupling said cores in cascade, each of said transfer circuits including a transistor having collector, emitter and base electrodes, a second winding linking said main aperture of one core and connected between said collector electrode and said input point of said input circuit for the next core, a third winding linking said second aperture of said one core and connected between said base and emitter electrodes, and means connecting said emitter electrode to said reference potential; and shift means for shifting information stored in one core to the next including a shift prime line linking said main aperture and said second aperture of all of said cores, and a shift line linking said main aperture of all of said cores.

11. A magnetic system for storing and transferring binary information comprising; a plurality of magnetic cores exhibiting essentially rectangular hysteresis loop characteristics, each core having a central aperture and second and third apertures located near the periphery of the central aperture; an input circuit for each said core including a resistor and an inductor connected in series with one another, a first winding linking said central aperture and said second aperture and connected between said resistor and a first voltage point, and means returning said inductor to said first voltage point; said cores connected in cascade by transfer circuit coupled between the first core and the next core, and so on, each said transfer circuit including a transistor having collector, emitter and base electrodes, a second winding linking said central aperture of one core and connected between the collector electrode and the junction point of the resistor and inductor of said input circuit of the next core, a third winding linking said second aperture of said one core and connected between said base and emitter electrodes, and means connecting said emitter electrode to a second voltage point; shift means for shifting information stored in one core to the next including a first prime line linking said main aperture and said second aperture of all of said cores and a shift line linking said main aperture of all of said cores; and output means including a second prime line linking said main aperture and said third aperture of all of said cores and individual output lines linking said third aperture of each of said cores.

12. A magnetic system for storing and transferring binary information including in combination; a plurality of magnetic cores exhibiting essentially rectangular hysteresis loop characteristics, each core having a main aperture and at least a second aperture located near the periphery of said main aperture; an input circuit for each of said cores including resistance means and reactance means connected in series with one another and in parallel to an input point, a first winding linking said central aperture and said second aperture, and first and second circuit means connecting said resistance means and said reactance means respectively between said input point and a first voltage point providing a direct current potential with respect to a reference potential, one of said first and second circuit means including said first windings; pulsing means selectively connecting said input point of said input circuit for one core to the reference point to apply pulses of current to said first winding representative of binary information; a plurality of transfer circuits coupling said cores in cascade, each of said transfer circuits including a transistor having collector, emitter and base electrodes a second winding linking said main aperture of one core and connected between said collector electrode and said input point of said input circuit for the next core, a third winding linking said second aperture of said one core and connected between said base and emitter electrodes, and means connecting said emitter electrode to said reference potential; reset means including a reset line linking said main apertures of all of said cores; and output means including a prime line linking said main aperture and said third aperture of all of said cores and individual output lines linking said third aperture of each of said cores.

13. A binary magnetic circuit including in combination, a magnetic core exhibiting essentially rectangular hysteresis loop characteristics, said core having a main aperture and at least a second aperture located near the periphery of the main aperture to provide first, second and third legs defining first and second annular flux paths, first winding means wound around said first leg and linking said first flux path, direct current voltage supply means, means connecting one end of said first winding means to said voltage supply means, resistor means and reactance means connected in series between the other end of said first winding means and said voltage supply means, means for applying successive input pulses to the junction point of said resistor means and said reactor means to produce a current pulse through said first winding means of a first polarity during an input pulse and a current pulse through said input winding means of a polarity opposite to said first polarity subsequent to said input pulse, second winding means wound around said second leg and linking said second flux path, third winding means wound around said third leg and linking both said flux paths, and an electronic switching device having an input electrode connected to said second winding means and an output electrode connected to said third winding means, whereby said input pulses successively cause reversal of one of the flux paths in said core to provide first and second magnetic states representing binary "0" and binary "1" information, respectively.

14. The circuit of claim 13 including further winding means linking both said flux paths and circuit means for applying pulses thereto to return said core from said second magnetic state to said first magnetic state.

15. The circuit of claim 14 in which said core has a third aperture located near the periphery of said main aperture to provide fourth and fifth legs therein, fourth winding means wound on said fourth leg and linking said first flux path, fifth and sixth winding means wound on said fifth leg and linking said second flux path, and means for successively applying pulses to said fourth and fifth winding means, respectively, thereby to produce a signal indicative of the magnetic states of said cores in said sixth winding means.

16. A binary magnetic circuit including in combination, a magnetic core exhibiting essentially rectangular hysteresis loop characteristcs, said core having a central aperture and at least a second aperture located near the periphery of the central aperture to provide first, second and third legs defining first and second annular flux paths, first winding means wound around said first leg and linking said first flux path, direct current voltage supply means having a first voltage point providing a direct current potential with respect to a reference point, means connecting one end of said first winding means to said first voltage point, a resistor and an inductor connected in series between the other end of said first winding means and said first voltage point; pulsing means for successively connecting the junction of said resistor and said inductor to the reference point to thereby produce a current pulse through said resistor and said first winding means of a first polarity during an input pulse and a current pulse through said resistor and said input winding means of a polarity opposite to said first polarity subsequent to said input pulse, a transistor having collector, emitter and base electrodes, a second winding means connected between said base and emitter electrodes and wound around said second leg to link said second flux path, and third winding means connected between said collector electrode and utilization means and wound around said third leg to link both said flux paths, whereby successive input pulses alternately cause reversal of one of the flux paths in said core to provide first and second magnetic states representing binary "0" and binary "1" information, respectively.

17. A magnetic system for storing and transferring binary information including in combination, a magnetic core exhibiting essentially rectangular hysteresis loop characteristics, said core having a central aperture and at least a second aperture located near the periphery of the central aperture to provide first, second and third legs defining first and second annular flux paths; input circuit means for each of said cores including resistor means and reactor means connected in series with one another and in parallel to an input point, a first winding wound around said first leg and linking said first flux path, and first and second circuit means connecting said resistor means and said reactor means respectively between said input point and a first voltage point providing a direct current potential with respect to a reference point, one of said first and second circuits including said first winding; pulsing means for successively connecting said input point to the reference point to thereby produce a current pulse through said first winding of a first polarity during an input pulse and a current pulse through said first winding of a polarity opposite to said first polarity subsequent to said input pulse; a transistor having collector and emitter electrodes, with said emitter electrode connected to the reference point, a second winding connected between said base and emitter electrodes and wound around said second leg to link said second flux path, and a third winding connected between said collector electrode and utilization means and wound around said third leg to link both said flux paths, whereby successive input pulses alternately cause reversal of one of the flux paths in said core to provide first and second magnetic states representing binary "0" and binary "1" information, respectively.

18. The system of claim 17 including a fourth winding wound around said first leg and linking said first flux path of all so cores, a fifth winding extending through said central aperture and linking both said flux paths of all said cores, and means for successively applying pulses to said fourth and fifth windings to thereby shift stored information from one core to the next.

References Cited

UNITED STATES PATENTS 3,217,178 11/1965 Burns ............ 340—174 X

JAMES W. MOFFITT, *Primary Examiner.*